United States Patent
Adamson et al.

(10) Patent No.: US 7,091,841 B2
(45) Date of Patent: Aug. 15, 2006

(54) TIRE ELECTRONICS ASSEMBLY HAVING A MULTI-FREQUENCY ANTENNA

(75) Inventors: John David Adamson, Clermont-Ferrand (FR); Patrick F. King, Simpsonville, SC (US)

(73) Assignee: Michelin Recherche et Technique, S.A., Granges-Peccot (CH)

( * ) Notice: Subject to any disclaimer, the term of this patent is extended or adjusted under 35 U.S.C. 154(b) by 0 days.

(21) Appl. No.: 11/204,634

(22) Filed: Aug. 16, 2005

(65) Prior Publication Data
US 2005/0275518 A1    Dec. 15, 2005

(51) Int. Cl.
*B60C 23/00*    (2006.01)
*B60C 23/02*    (2006.01)
*B60C 19/00*    (2006.01)
*B60C 19/08*    (2006.01)
*G08B 13/14*    (2006.01)
*H01Q 9/16*    (2006.01)
*H01Q 9/28*    (2006.01)
*H01Q 1/36*    (2006.01)

(52) U.S. Cl. ............... 340/447; 340/442; 340/443; 340/444; 340/445; 340/446; 340/572.1; 340/572.7; 73/146; 73/146.5; 152/152.1; 343/795; 343/806; 343/895

(58) Field of Classification Search ........ 340/442–447, 340/572.1–572.5, 572.7; 73/146.1–146.5, 73/146; 152/152.1; 343/806, 795, 895
See application file for complete search history.

(56) References Cited

U.S. PATENT DOCUMENTS

| | | | | |
|---|---|---|---|---|
| 5,448,110 A | * | 9/1995 | Tuttle et al. | 257/723 |
| 5,573,611 A | * | 11/1996 | Koch et al. | 152/152.1 |
| 6,630,910 B1 | * | 10/2003 | Forster et al. | 343/806 |
| 6,734,791 B1 | * | 5/2004 | Kelly et al. | 340/445 |
| 6,903,704 B1 | * | 6/2005 | Forster et al. | 343/806 |

OTHER PUBLICATIONS

International Search Report, dated Dec. 23, 2003 for PCT/US03/04863, Filed Feb. 19, 2003.

* cited by examiner

*Primary Examiner*—Daniel Wu
*Assistant Examiner*—Lam Pham
(74) *Attorney, Agent, or Firm*—Adam Arnold; E. Martin Remic; Frank J. Campigor (57) ABSTRACT

A tire assembly with integrated electronic components includes a tire structure and an integrated electronics assembly, which preferably includes at least a radio frequency (RF) device and a multi-frequency antenna that enables wireless communication in at least first and second resonant frequency bands. Such multi-frequency antenna further comprises at least first and second antenna wires connected to the RF device, thus facilitating the transmission of RF signals which may include information such as tire identification information or measured condition information such as tire temperature, pressure, and other characteristics. The first and second antenna wires preferably function together as at least two dipole antennas, for example, two half-wave dipole antennas, or one half-wave dipole antenna and one three-half-wave dipole antenna. A two-wire configuration may be more readily implemented and also designed to reduce strains concentrated at the connection point(s) between the RF device and the antenna wires.

10 Claims, 8 Drawing Sheets

TIRE ELECTRONICS ASSEMBLY HAVING A MULTI-FREQUENCY ANTENNA

FIELD OF THE INVENTION

The present invention generally concerns tire electronics assemblies that communicate various information related to tire identification and/or measurements of selected physical conditions of a tire. More particularly, the subject tire electronics assemblies utilize improved antenna configurations that allow for effective signal propagation at multiple frequency levels. Such multi-frequency antenna configurations may be designed with improved mechanical robustness and versatile communication capabilities.

BACKGROUND OF THE INVENTION

The incorporation of electronic devices with pneumatic tire structures yields many practical advantages. Tire electronics may include sensors and other components for relaying tire identification parameters and also for obtaining information regarding various physical parameters of a tire, such as temperature, pressure, number of tire revolutions, vehicle speed, etc. Such performance information may become useful in tire monitoring and warning systems, and may even potentially be employed with feedback systems to regulate proper tire pressure levels.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system. U.S. Pat. No. 4,869,486 (Wing et al.) also relates to tire electronics, and more particularly discloses an exemplary revolution counter for use in conjunction with automotive and truck tires. Examples of aspects of tire pressure monitoring systems are disclosed in U.S. Pat. Nos. 4,004,271 (Haven et al.), U.S. Pat. No. 4,742,857 (Gandhi), U.S. Pat. No. 5,616,196 (Loewe), and U.S. Pat. No. 5,928,444 (Loewe et al.).

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning equipment. Entire fleets of vehicles could be tracked using RF tag transmission, exemplary aspects of which are disclosed in U.S. Pat. No. 5,457,447 (Ghaem et al.).

Since electronics assemblies within a tire typically relay information in a wireless fashion, such assemblies must often include a radio frequency (RF) device outfitted with one or more antennas. An example of an antenna for use with transponder type devices in a tire monitoring environment is disclosed in U.S. Pat. No. 5,196,845 (Myatt.) The frequency at which such RF device preferably operates (and the corresponding frequency at which the antenna preferably resonates) varies depending on geographic location. This is due in part to the fact that RF regulations and standards are not globally homogeneous. Authorized operational frequencies, duty cycles, power levels, etc. of an RF device often differ among continents and/or countries. As such, it may be desirable for a single electronics assembly and corresponding antenna to effectively transmit and receive RF signal information at multiple frequencies of interest.

Other design features besides electrical performance characteristics may be of importance to electronics assemblies and antennas used specifically in a tire environment. Such components are provided relative to a location that is constantly moving and flexing, thus subjecting the components to excessive heat as well as tension and other dynamic forces. Such forces may yield a potential for damaging the electronics assemblies and associated antenna structure. A particular example of such undesirable damage corresponds to an antenna being separated from its associated electronic assembly and/or RF device. As such, electronic devices and corresponding antenna structures for use within a tire may be designed with practicality and mechanical robustness in mind.

The disclosures of all of the foregoing United States patents are hereby fully incorporated into this application for all purposes by reference thereto. While various tire electronics systems and antenna structures therefor have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved electronics assembly for integration with a tire structure has been developed. Such an electronics assembly includes antenna features that effect RF communication at multiple different frequency levels.

It is an advantage of embodiments of the disclosed technology to transmit and/or receive RF signals in at least two different frequency bands such that an electronics assembly is capable of international use in compliance with established RF communications standards. The presently disclosed aspects of antenna design can be applied to many different specific frequency bands of interest. Some exemplary frequencies of interest correspond to those in the UHF frequency band as utilized in RFID communications, including 860–930 MHz and 2450 MHz.

It is a further advantage of select embodiments of the disclosed technology to provide a readily manufactured device. By connecting a minimum number of wires to an RF device, multi-frequency antenna structures can be implemented in a simple manner, while effecting an assembly configuration with improved mechanical robustness. Two-wire antenna designs may in some instances provide reduced mechanical strain at the connection between an RF device and antenna wires connected thereto. Thus, when such an assembly is integrated into an elastomer casing, the need for flexible antenna features may be reduced or eliminated.

Aspects of the present technology also afford a variety of design options. Not only can the subject electronics assemblies and antenna configurations therefor be designed to operate at multiple different frequencies, but different device formations may also be implemented. For instance, antenna leads may be formed with relatively straight or curved portions to facilitate RF coupling or integration within a tire structure. Antenna leads with curved ends may offer additional stabilizing features. The respective angles between adjacent antenna leads may also be varied in accordance with the disclosed technology.

In one exemplary embodiment of the present invention, a tire assembly with integrated electronics components comprises a tire structure, an RF device, and a multi-frequency antenna. The RF device is preferably configured to transmit or reflect RF signals, which may include such information as that corresponding to identification of a tire structure or to measurements of tire conditions such as temperature and pressure. The multi-frequency antenna is preferably connected to the RF device and facilitates the transmission and reception of the RF signals at first and second resonant frequencies (or frequency bands.) The RF device and multi-frequency antenna (together forming an exemplary electronics assembly in accordance with the present subject matter) may be directly integrated with the tire structure or alternatively embedded in a flexible dielectric casing which is then integrated with the tire structure.

In accordance with more particular embodiments of the present technology, the electronics assembly's multi-frequency antenna may comprise at least first and second antenna wires which are connected to an RF device. Such first and second antenna wires may form respective first and second antenna leads that function together as a half-wave dipole antenna at a first resonant frequency and that simultaneously function together as a three-half-wave dipole antenna at a second resonant frequency. In other embodiments, the first and second antenna wires form first and second long antenna leads and first and second short antenna leads. The pair of long antenna leads may be designed to operate as a dipole antenna at a first resonant frequency and the pair of short antenna leads to operate as a dipole antenna at a second resonant frequency. In some embodiments, each dipole antenna corresponds to a half-wave dipole antenna. In alternative embodiments, the two long leads and the two short leads may be collectively formed by four separate antenna wires.

Additional features may be incorporated with any of the aforementioned exemplary embodiments of the present technology. For instance, selected portions (e.g., the end portions) of each antenna wire forming a multi-frequency antenna may be curved to accommodate specific tire architectures or to yield more stable antenna designs. Antenna leads may be straight or formed in a curved manner such as with undulating or sawtooth configurations. Furthermore, antenna leads may also be positioned at selected angles to one another to facilitate desired performance characteristics, and also to help avoid physical contact among distinct antenna leads. Some embodiments of the present subject matter may further include a support substrate provided adjacent to selected portions of an electronics assembly to provide additional mechanical support for the connection between an RF device and antenna leads.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present invention may include various combinations or configurations of presently disclosed features, steps, or elements, or their equivalents (including combinations of features, parts, or steps or configurations thereof not expressly shown in the figures or stated in the detailed description of such figures). Additional embodiments of the present invention, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters throughout the present specification and appended drawings is intended to represent same or analogous features or elements of the invention.

DETAILED DESCRIPTION OF THE PREFERRED EMBODIMENTS

Figure 1:
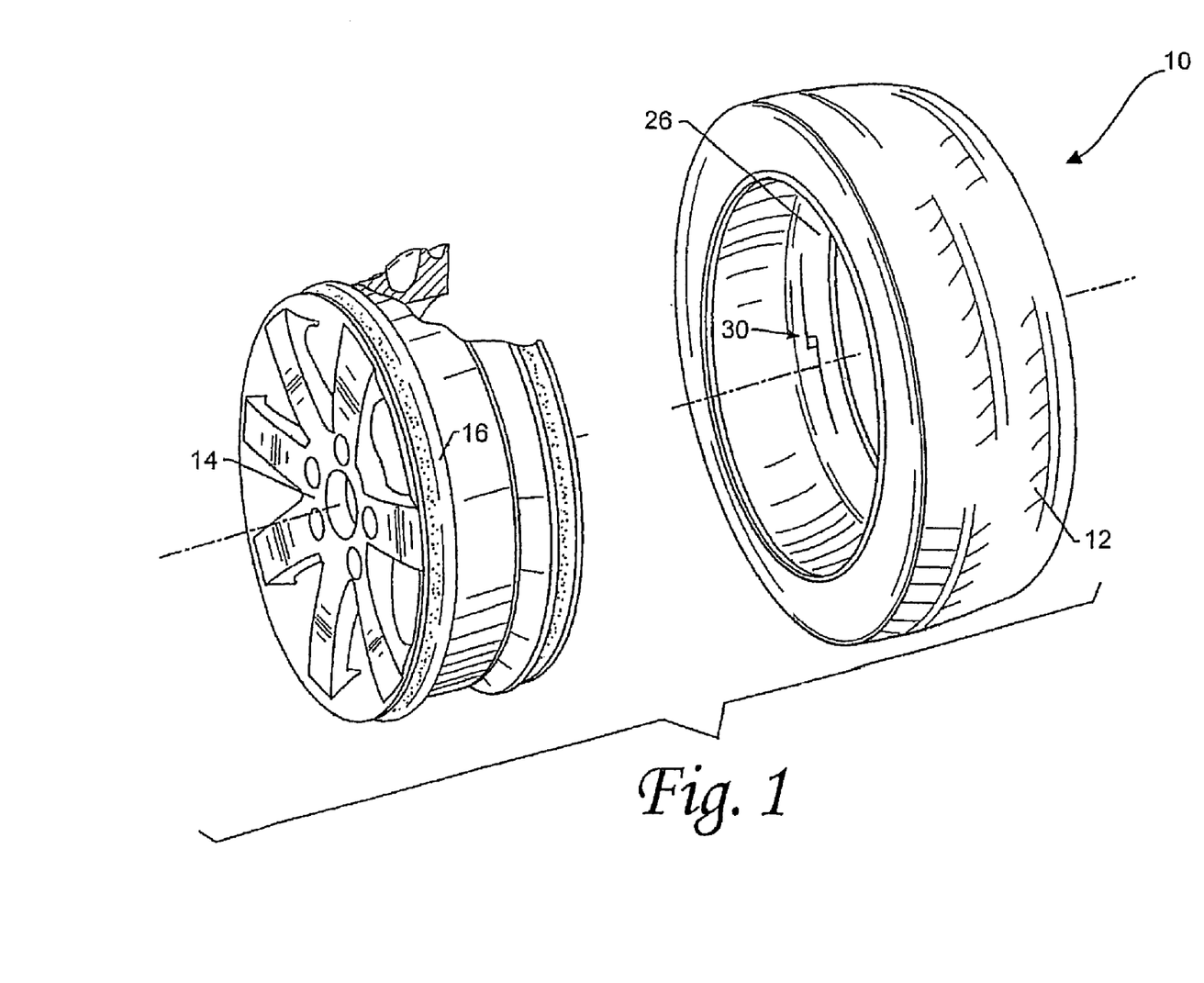
FIG. 1 is a perspective view of a tire assembly with integrated electronic components in accordance with the present invention.
Figure 2:
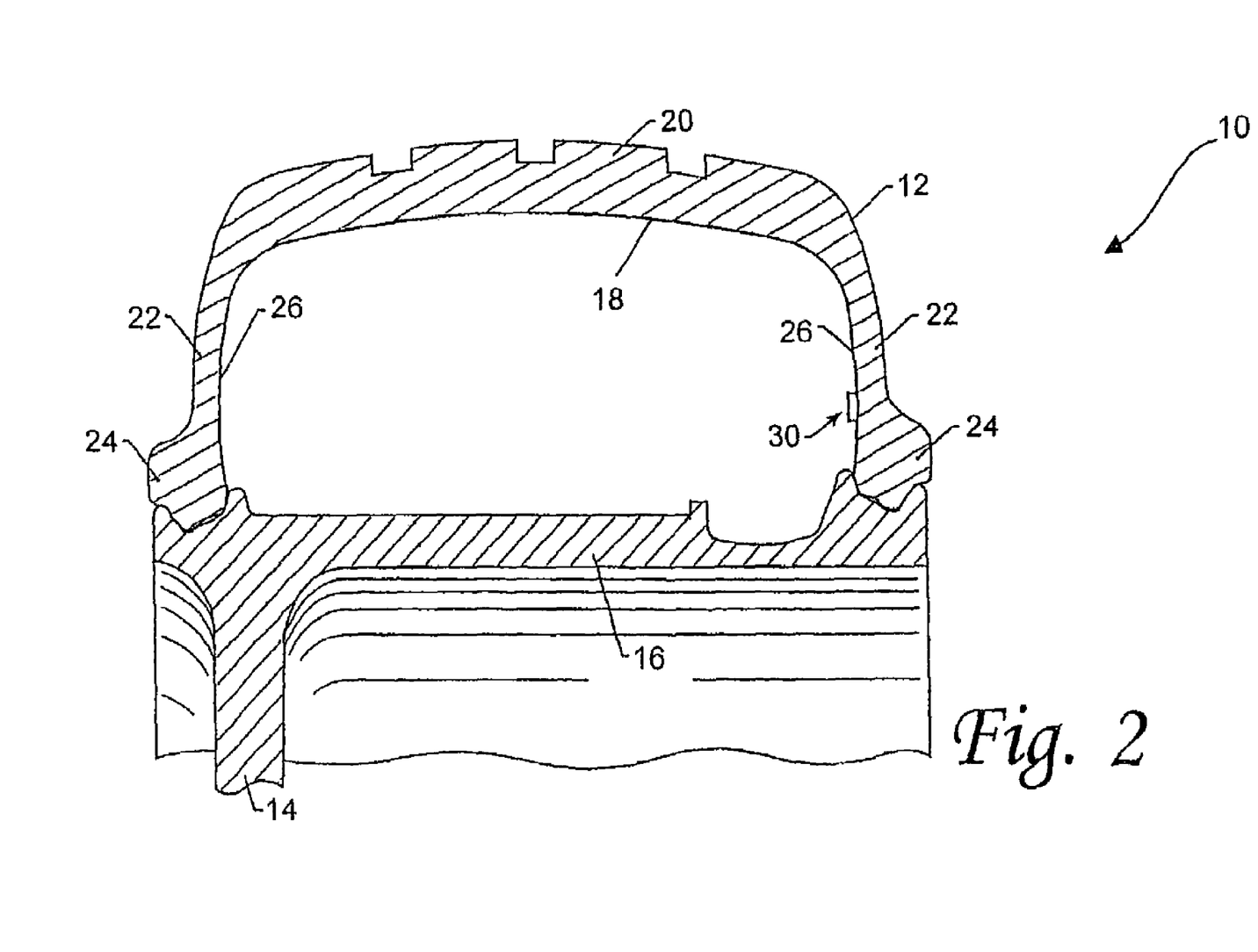
FIG. 2 is a partial cross-sectional view of a tire assembly with integrated electronic components positioned relative to a bead of the tire in accordance with the present invention.

As discussed in the Summary of the Invention section, the present invention is particularly concerned with tire electronics assemblies that relay various information related to tire identification and/or measurements of selected physical conditions of a tire. FIGS. 1 and 2 illustrate exemplary tire assemblies, including such electronics assemblies positioned relative to the interior of a tire structure. The subject tire electronics assemblies utilize improved antenna configurations that allow for effective signal propagation at multiple frequency levels. Such multi-frequency antenna configurations may be designed with improved mechanical robustness and versatile communication capabilities. Exemplary embodiments of such electronics assemblies are illustrated in FIGS. 3A, 3B and 6A–9, respectively.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject tire electronics assemblies and corresponding multi-frequency antenna configurations. Referring now to the drawings, FIGS. 1 and 2 illustrate respective views of a tire assembly in accordance with the present subject matter. A tire assembly 10 includes a pneumatic tire structure 12 which is typically formed for positioning on the rim portion 16 of a wheel 14. Tire structure 12 is typically characterized by a crown 18 which supports an exterior tread portion 20 and sidewalls 22 that extend to bead portions 24. Tire beads 24 are generally provided such that the tire structure 12 can be effectively seated to bead seats in the rim portion 16 of wheel 14. An inner liner of air-impermeable material forms the interior surface of the tire, including the interior surface of crown 18 and interior sidewall surfaces 26. A carcass is provided internal to tire structure 12 and extends between beads 24 across sidewall portions 16 and crown 18, and under inflation pressure defines the tire's shape and transmits forces for traction and steering.

Electronics assembly 30, as illustrated in FIGS. 1 and 2, may be mounted to an interior sidewall surface 26 of tire structure 12. Such location along an interior sidewall surface 26, and especially a location close to the axis of rotation of wheel assembly 14 is generally well-suited since the portion near a tire bead 24 typically experiences the least amount of flexure during normal use of the tire. However, it should be appreciated that an electronics assembly 30 in accordance with the present subject matter can be placed in any location along the interior surface of tire structure 12. Electronics assembly 30 can be mounted directly to the interior surface location of tire structure 12 or can first be embedded in a dielectric casing, which is then mounted to the interior surface of tire structure 12. An example of a suitable dielectric material for encasing electronics assembly 30 corresponds to a flexible elastomer. Further, electronics assembly 30 may be mounted and cured within the actual tire structure 12, for example between the carcass and inner liner. In accordance with the variety of possible locations for electronics assembly 30, it should be understood that the term "integrated" generally encompasses all possible locations, including mounted on or in a tire structure or dielectric casing.

An electronics assembly 30 in accordance with the present invention is provided for incorporation with tire structure 12, and offers many advantages for tire manufacturers, tire distributors, and end customers. Many of such advantages are realized by the wireless communication of signals between an integrated location within tire structure 19 and some remote location, and thus electronics assembly 30 preferably includes a radio frequency (RF) device, such as a radio frequency identification (RFID) transponder. Associated RF signals may include preprogrammed identification (ID) information for a tire, such as that indicative of a tire's date of manufacture and date and/or location of placement on a given vehicle, which may be utilized in asset tracking and other applications. Other information that may be contained in RF signals from electronics assembly 30 corresponds to measurement of physical tire parameters, such as temperature, pressure, number of tire revolutions, vehicle speed, etc. Detection means for measuring such physical parameters may be included in a given RF device or may correspond to separate sensor elements (e.g., temperature sensor, pressure sensor, revolution counter, etc.) that are then coupled to the RF device. In some embodiments, a surface acoustic wave (SAW) device may be employed to measure both temperature and pressure in a given environment. Electronics assembly 30 may then wirelessly communicate with an information system outside of a vehicle. For instance, the improved electronics component assembly 30 may communicate with a drive-by interrogator or with a hand-held interrogator. Additionally, the improved electronics assembly 30 may also communicate with a device onboard the vehicle, such as an onboard computer, so that a driver may monitor various parameters of the tire.

The frequency of RF signals provided by electronics assembly 30 may preferably be different depending on one's geographic location. This is due in part to the fact that RF regulations and standards are not globally homogeneous. For instance, the global tire market typically includes North America, Europe, and Asia, each of which may support different frequency ranges for RFID communications. Common RFID frequency standards are 915 MHz for North America, 868 MHz for Europe, and 2.45 GHz for Japan. Thus, an electronics assembly in accordance with the present invention includes an antenna design which is optimized for signal propagation at multiple different frequency levels. As such, a given tire and associated electronics assembly can be utilized in many different countries and be capable of effective operation and communication in compliance with different global RFID frequency regulations. For the sake of convenience, exemplary configurations of the present invention are presented in accordance with operation in the RFID frequency bands mentioned above (868 MHz for Europe, 915 MHz for North America, and 2.45 GHz for Japan). It should be appreciated however, that electronics assemblies in accordance with the present invention may operate at different specific frequencies of interest. In general, it should be appreciated that the subject electronics assembly and multi-frequency antenna designs may operate at any level within the Very-High Frequency (VHF) or Ultra-High Frequency (UHF) bands, especially including the range from 300 MHz to 3000 MHz (3.0 GHz). As RFID frequency standards change, it should be further appreciated that corresponding modification of the present technology to provide effective operation in still other frequency bands of interest is within the spirit and scope of the present invention.

Figure 3A:
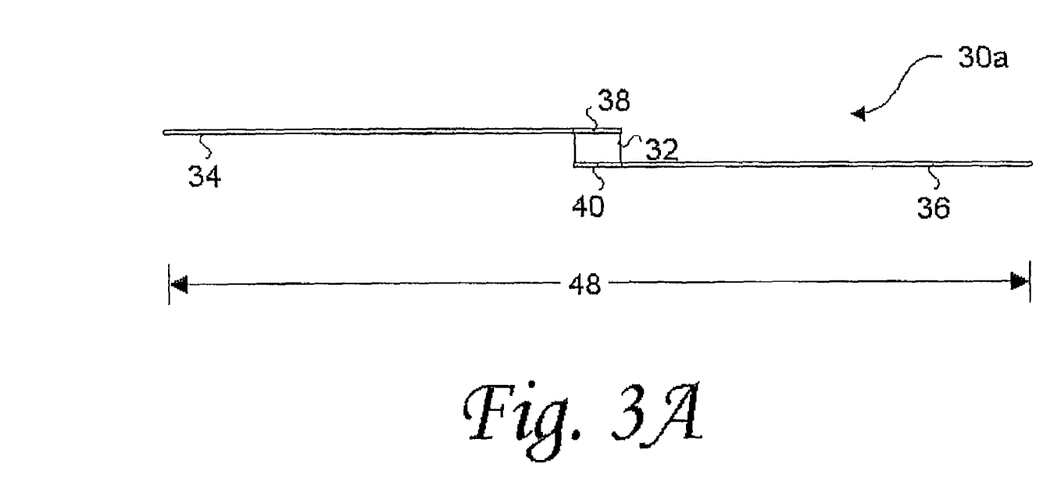
FIGS. 3A and 3B are generally plan views of respective exemplary embodiments of an electronics assembly with a multi-frequency antenna in accordance with the present invention.

A first electronics assembly embodiment 30a in accordance with the present invention is illustrated in FIG. 3A. Such electronics assembly includes a radio frequency (RF) device 32, which may in one exemplary embodiment correspond to an RFID transponder (or RFID tag), such as an Intellitag brand RFID transponder offered for sale by Intermec Technologies Corporation. RF device 32 may be made up of at least a silicon chip and signaling components for relaying RF signals to a remote location. RF devices in accordance with the present technology may be either active devices, which transmit signals directly to a remote location, or passive devices, which reflect or backscatter transmission from a separate interrogator or reader device. The RF signals relayed by RF device 32 may in some embodiments be characterized by selected frequency levels in the UHF band of 300 MHz to 3000 MHz. Such RF signals may include a variety of predetermined information, including various preprogrammed identification information for a tire structure, as previously mentioned. RF device 32 may also include an application-specific integrated circuit (ASIC) for further customizing the identification information available to a user. Additional sensor elements, such as those suitable for monitoring the temperature, pressure, and other conditions within a tire, may be integrated with or coupled to RF device 32 so that measurements of a tire's physical conditions may also be included in the RF signals communicated by RF device 32.

Referring still to FIG. 3A, exemplary electronics assembly embodiment 30a further comprises first antenna wire 34 and second antenna wire 36 that are attached to opposing sides of RF device 32 via electrical connections 38 and 40. An example of a suitable material for antenna wires 34 and 36 corresponds to a brass-coated steel with a diameter between about 0.4 and 0.5 mm. Electrical connections 38 and 40 correspond to actual physical connections between respective antenna wires 34 and 36 to RF device 32, and such connections may be made by a variety of methods. For instance, antenna wires 34 and 36 may be soldered to respective pads on RF device 32, or they may be pinned into or onto the electronics package, or attached using clamps; screws, conductive adhesive, or other means as within the purview of one of skill in the art. As shown in FIG. 3A, antenna wires 34 and 36 extend in opposing directions to one another and in a generally parallel fashion to one other. It should be appreciated that these arms may be positioned at different angles or in various curved configurations to facilitate RF coupling and/or mounting within a tire structure. For instance, antenna wires 34 and 36 may be formed with curved portions 35 and 37 at the respective ends extending away from RF device 32, as illustrated with regards to embodiment 30b of FIG. 3B. The curved portions 35 and 37 provide a stabilizing mechanism for electronics assembly 30b when it is integrated with a tire structure. When the electronics assembly is actually embedded in such a tire structure or in a dielectric casing, such curved portions help prevent the ends of antenna wires 34 and 36 from protruding from their respective embedded locations.

Figure 3B:
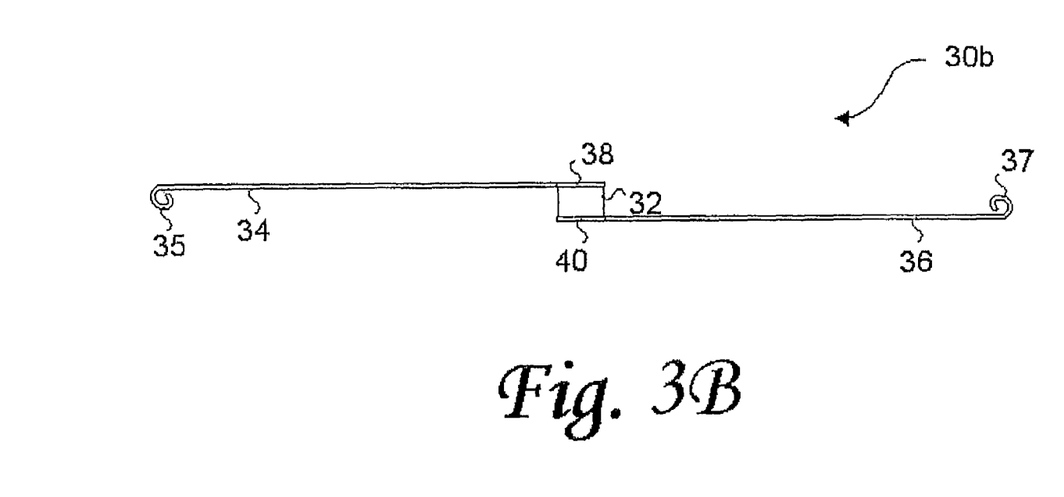

Antenna wires 34 and 36 function together as a dipole antenna to facilitate the transmission of RF signals from RF device 32 to a remote location. The lengths of antenna wires 34 and 36 are specifically designed to yield effective multi-frequency operation in accordance with the present invention. A dipole antenna functions at a given resonant frequency (f) when the antenna length is a multiple of λ/2, where λ is the wavelength in meters of the electromagnetic field propagating from the antenna. If it is desired to have an antenna propagating in free space at a given frequency (f), the corresponding wavelength (l) can be determined from the following formula:

$$\lambda(\text{meters}) = \frac{3 \cdot 10^8}{f(\text{Hz})}.$$

Thus, for the three exemplary frequencies of interest previously mentioned for RFID operation in North America, Europe and Japan, the following information as presented in Table 1 is readily determined.

TABLE 1

WAVELENGTH PROPERTIES FOR GIVEN FREQUENCIES

| FREQUENCY: | WAVELENGTH: (λ) | ½ WAVELENGTH: (λ/2) | 3/2 WAVELENGTH: (3λ/2) |
|---|---|---|---|
| 868 MHz | 345 mm | <u>173</u> mm | 517 mm |
| 915 MHz | 328 mm | <u>163</u> mm | 492 mm |
| 2450 MHz | 122 mm | 61 mm | <u>183</u> mm |

Figure 4:
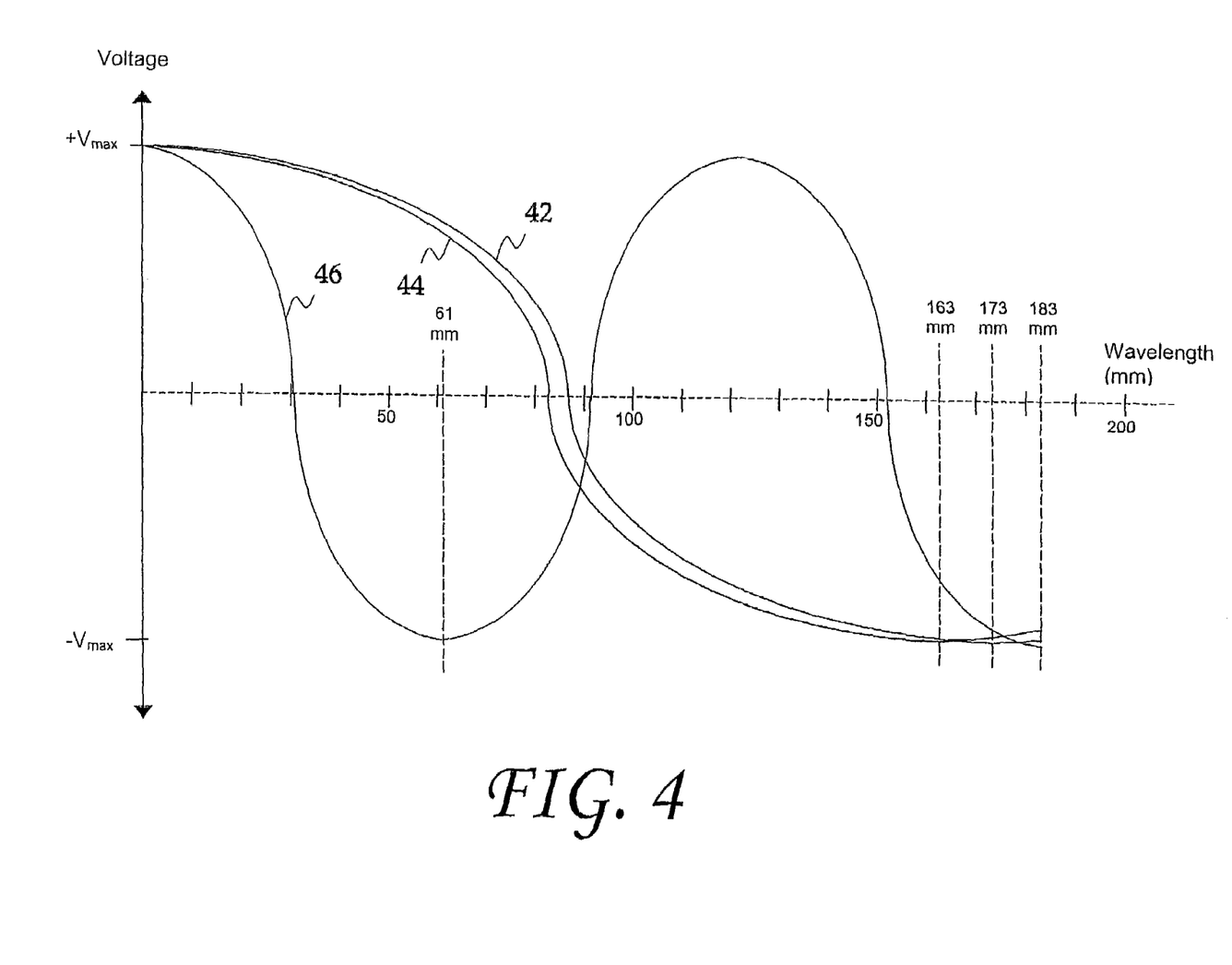
FIG. 4 provides a graphical representation of the voltage radiation level versus wavelength for various frequencies of interest in accordance with multi-frequency antenna operation of the embodiments of FIGS. 3A and 3B.

It is noted from Table 1 that the half-wavelengths for 868 MHz and 915 MHz are 173 mm and 163 mm, respectively, while the three-half-wavelength for 2450 MHz is 183 mm. These exemplary values are provided for operation in free air. This can also be seen from the graphical illustration of FIG. 4, which depicts the voltage radiation level for an antenna resonating in free air at these three exemplary frequencies. Curve 42 represents the voltage radiation at 868 MHz, curve 44 represents the voltage radiation at 915 MHz, and curve 46 represents the voltage radiation at 2450 MHz. As noted from the graph, the level of voltage radiation from each such dipole antenna is at its maximum peak within a transmission element at lengths of every multiple of λ/2. When looking at the peak voltage levels for the 868 and 915 MHz antennas operating as half-wave dipole antennas and for the 2450 MHz antenna operating as a three-half-wave dipole antenna, it is noted that the voltage radiation levels at 183 mm are all relatively near their respective peak values. This is due in part to the relatively low quality (Q) factor for the half-wave dipole antennas operating at 868 MHz and at 915 MHz. Thus, the length of antenna wires 34 and 36 may be designed to start in accordance with a dipole length of 183 mm. Thus, the distance 48 from the end of antenna wire 34 to the end of antenna wire 36 for this particular example is preferably about 183 mm.

It should be noted that antennas in accordance with the present subject matter may often be embedded in a some sort of dielectric material, which affects the desired length of the antenna wires. For example, with an elastomer or other material having a dielectric constant of about 3 or more, the length of antenna wires 34 and 36 is preferably shortened to about 94 mm. Such design effects a multi-frequency antenna that operates in a first resonant frequency band (for example, one inclusive of at least 862–928 MHz) and in a second resonant frequency band (such as one inclusive of at least 2.44–2.46 GHz.) It should be appreciated that when electronics assembly 30 is to be embedded in a dielectric casing, the designed length of antenna wires 37 and 36 may be varied accordingly.

Figure 5A:
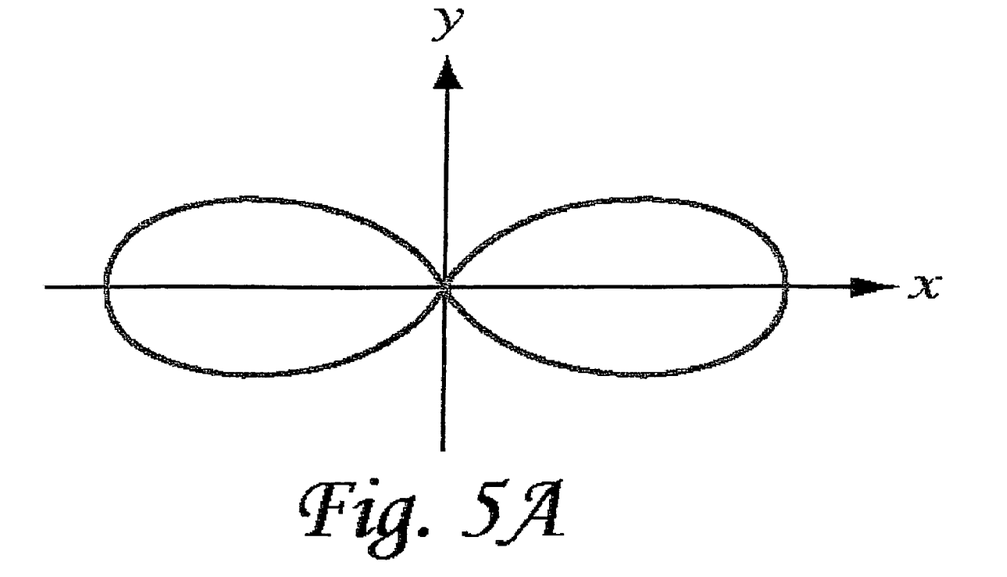
FIGS. 5A and 5B display respective graphical representations of radiation patterns at two different modes of operation of the multi-frequency antenna of the exemplary embodiments depicted in FIGS. 3A and 3B.
Figure 5B:
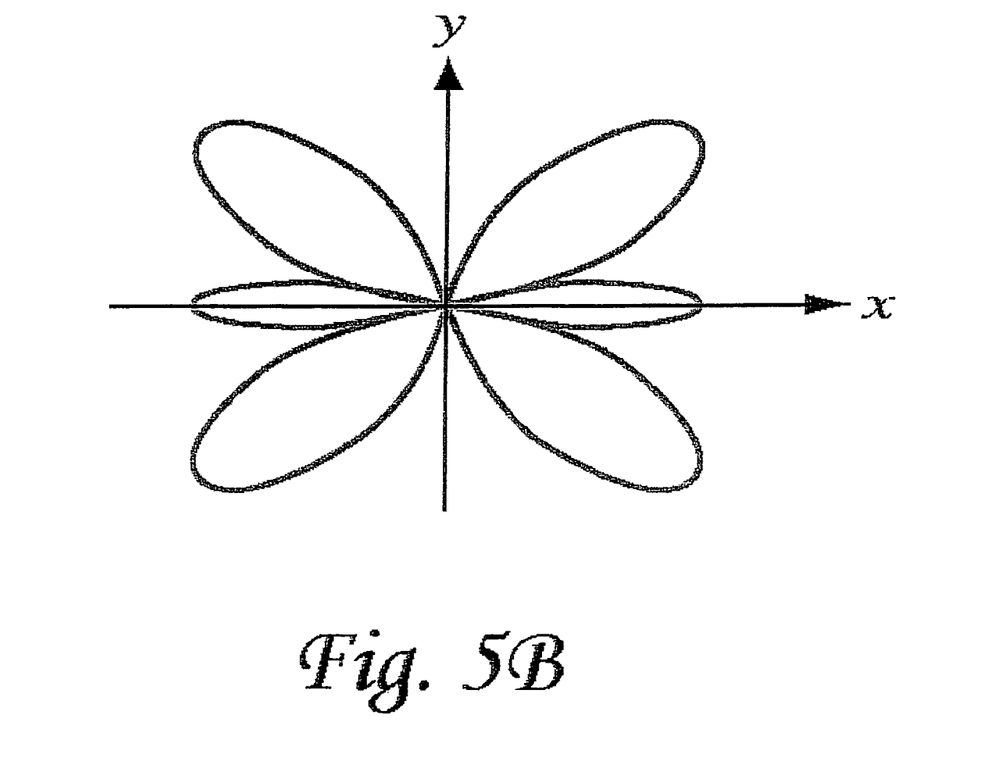

It should be noted that various operational differences, such as those regarding the gain, power levels and radiation patterns of the multi-frequency antenna for electronics assembly 30a/30b of FIGS. 3A and 3B exist when such antenna operates as a half-wave dipole antenna versus a three-half-wave dipole antenna. For instance, FIG. 5A depicts a typical radiation pattern for a half-wave dipole antenna, and FIG. 5B illustrates that typical of a three-half-wave dipole antenna. Although illustrated in a two-dimensional perspective, it should be appreciated that antenna radiation for a dipole antenna is in a generally three-dimensional fashion with lobe portions as illustrated. Due to the difference in the directional lobes in the radiation pattern of a three-half-wave dipole antenna (as illustrated in FIG. 5B), a reader/interrogator may need to be positioned at an angle to the RF device of electronics assembly 30a/30b of FIGS. 3A and 3B to properly obtain communicated RF signals.

An antenna as depicted in FIG. 3A was built with a dipole length of 183 mm and tested in free air with RFID readers configured for operation at different specific frequency levels. For instance, a 2.45 GHz reader operating under FCC conditions was able to effectively obtain RF signals from such exemplary electronics assembly at a distance of about 5 cm from the assembly. Similarly, a 915 MHz reader effectively received RF signals at a distance of about 230 cm from the assembly. Although not specifically tested with a 868 MHz reader, read distances should be similar to those obtained with a 915 MHz reader.

Figure 6A:
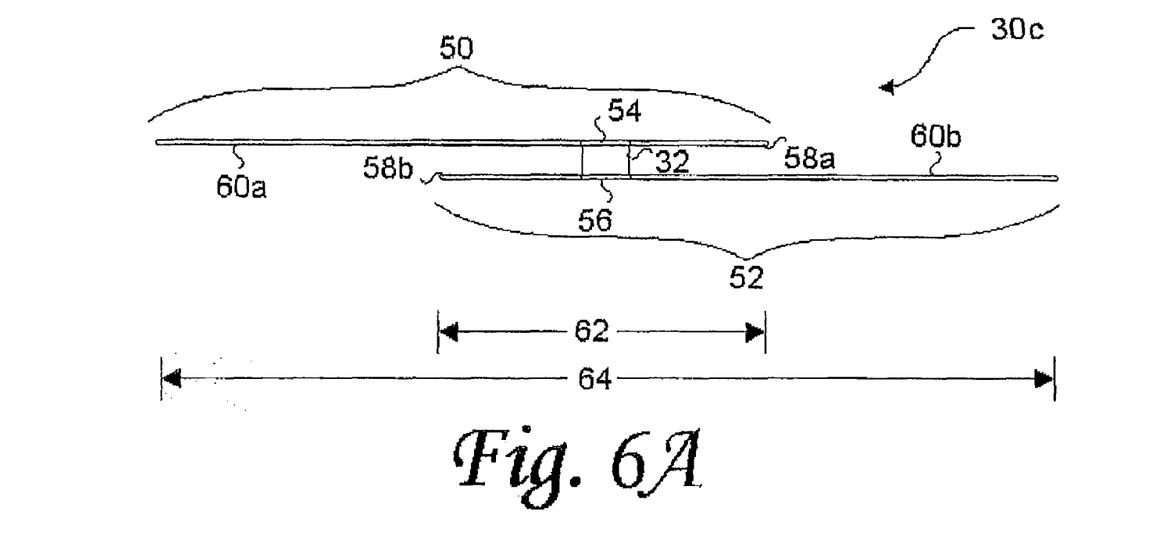
FIGS. 6A and 6B are generally plan views of additional exemplary embodiments of an electronics assembly with a multi-frequency antenna in accordance with the present invention.

Another exemplary electronics assembly embodiment 30c in accordance with the present invention is illustrated in FIG. 6A and includes an RF device 32 to which a first antenna wire 50 and a second antenna wire 52 are coupled via electrical connections at 54 and 56. Antenna wire 50 is preferably configured such that it forms a first short antenna lead 58a and a first long antenna lead 60a. Similarly, antenna wire 52 is configured to form second short antenna lead 58b and second long antenna lead 60b. Both long antenna leads 60a and 60b may be respectively formed at a first length such that leads 60a and 60b function together as a dipole antenna at a first resonant frequency. Both short antenna leads 58a and 58b may be respectively formed at a second length such that the short antenna leads 58a and 58b function together as a dipole antenna at a second resonant frequency. It should be appreciated that in alternative embodiments, antenna leads 58a, 58b, 60a and 60b may each be formed by a separate antenna wire.

Consider the exemplary frequency example previously discussed, whereby it is desired to relay RF signals at multiple frequencies of interest. Consider then that one of the dipole antennas effected by exemplary electronics assembly 30c is designed to operate at a first resonant frequency in a range of between about 860 MHz to about 930 MHz and the other at a second resonant frequency of about 2450 MHz. In choosing that both dipole antennas operate as half-wave dipole antennas, corresponding lead lengths for such operation can be determined from the data provided in Table 1. For a half-wave dipole antenna operating at 2450 MHz, length 62 should be about 61 mm for operation in free air. In such a case, it is thus preferred that each short lead 58a and 58b has a length of about 30 mm. For a half-wave dipole operating at a range inclusive of 868 MHz and 915 MHz, length 64 should be between about 163 mm and 173 mm for operation in free air. Thus, long leads 60a and 60b may each be characterized by a length of about 84 mm each. It should be appreciated that both dipole antennas may alternatively operate as dipole antennas other than half-wave dipole antennas (e.g., three-half-wave dipole antennas.)

As previously mentioned, when electronics assembly 30c is embedded in a dielectric casing, antenna wires 50 and 52 may need to be shortened for effective operation, and thus the antenna wire lengths before embedding of the electronics assembly may be defined accordingly to account for any such variations. For example, with an elastomer or other material having a dielectric constant of about 3 or more, the length of short leads 58a and 58b are preferably about 16 mm and the length of long leads 60a and 60b are preferably about 47 mm.

An antenna as depicted in FIG. 6A was built with long leads 60a and 60b of about 85 mm each and short leads 58a and 58b of about 30 mm each, and tested in free air with RFID readers configured for operation at different specific frequency levels. For instance, a 2.45 GHz reader operating under FCC conditions was able to effectively obtain RF signals from such exemplary electronics assembly 30c at a distance of about 26 cm from the assembly. Similarly, a 915 MHz reader effectively received RF signals at a distance of about 93 cm from the assembly. Although not specifically tested with a 868 MHz reader, read distances should be similar to those obtained with a 915 MHz reader.

Certain advantages are provided by the antenna configuration in exemplary electronics assembly embodiment 30c. Not only is embodiment 30c capable of operation at multiple different frequency levels, but it is also a readily manufactured device. More particularly, electronics assembly 30c requires only two antenna wires 50 and 52 to be attached to RF device 32. Thus, a single continuous wire 50 forms both short 58a and long lead 60a, while wire 52 forms both short lead 58b and long lead 60b. Yet another advantage of such configuration is that when embodiment 30c is embedded in a dielectric casing or in a tire structure, short lead 58a provides counterstrain for long lead 60a and short lead 58b provides counterstrain for long lead 60b. This greatly reduces the dynamic forces concentrated at each connection 54 and 56 between RF device 62 and antenna wires 50 and 52, especially when a tire is flexed during use. Such reduced strain helps prevent the antenna wires from separating from the RF device, thus yielding an electronics assembly design with improved mechanical robustness.

Different variations of the exemplary electronics assembly 30c and corresponding antenna configuration may be implemented in accordance with the present subject matter. For instance, selected respective ends of antenna leads 58a, 58b, 60a and 60b may be formed with curved portions 66a, 66b, 68a and 68b as illustrated in accordance with embodiment 30d of FIG. 6B. Such curved portions 66a, 66b, 68a and 68b provide a stabilizing mechanism for electronics assembly 30d when it is integrated with a tire structure. When the electronics assembly is actually embedded in such a tire structure or in a dielectric casing, such curved portions help prevent the ends of antenna wires 58a, 58b, 60a and 60b from protruding from their respective embedded locations.

Figure 6B:
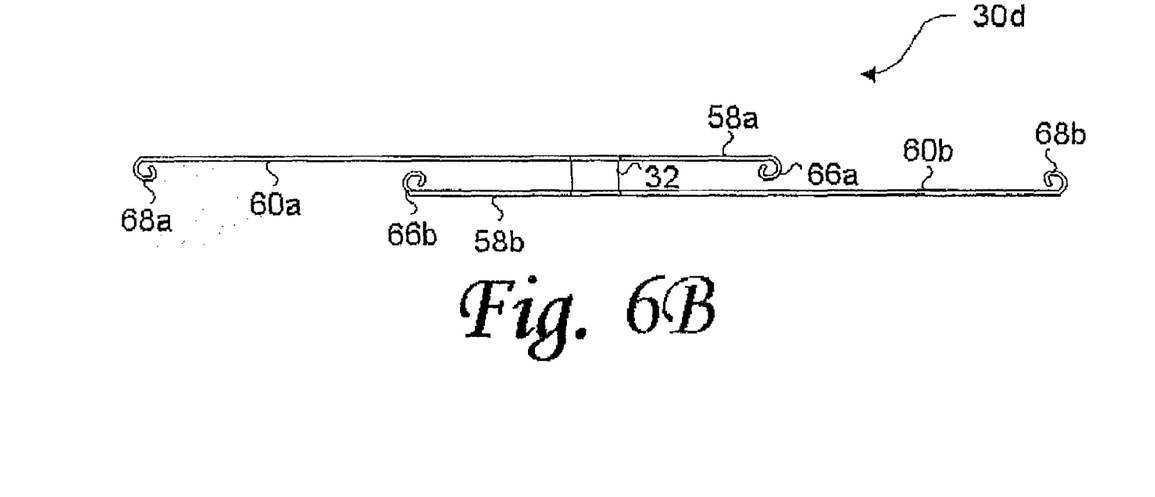
Figure 7:
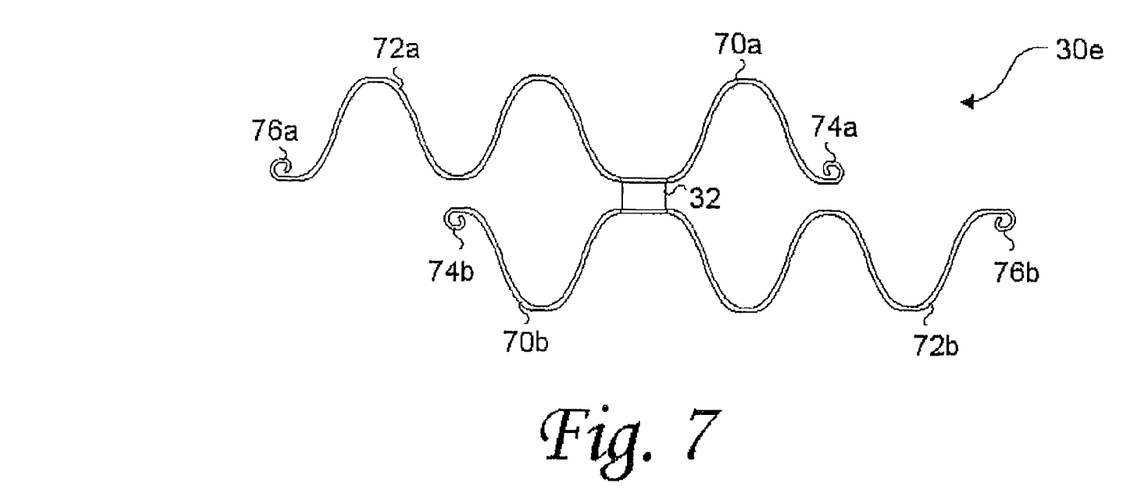
FIG. 7 is a generally plan view of a still further exemplary embodiment of an electronics assembly with a multi-frequency antenna in accordance with the present invention.

Yet another exemplary electronics assembly embodiment of the present invention includes further variations to the electronics assemblies 30c and 30d as depicted in FIGS. 6A and 6B. Electronics assembly embodiment 30e of FIG. 7 is similar to electronics assembly embodiment 30d of FIG. 6B, but the antenna leads are not formed in a linear fashion. First and second short antenna leads 70a and 70b as well as first and second long antenna leads 72a and 72b are formed in an undulated configuration. It should be appreciated that other non-linear antenna configurations, such as having antenna leads formed in a sawtooth pattern, may also be utilized in accordance with the present subject matter. The top and bottom antenna leads may need to be in phase to avoid physical contact. Selected ends of antenna leads 70a, 70b, 72*a* and 72*b* in the embodiment 30*e* of FIG. 7 may also be formed with respective curved portions 74*a*, 74*b*, 76*a* and 76*b*, thus providing stabilizing mechanisms when embedded in a tire structure or flexible elastomer casing.

Figure 8:
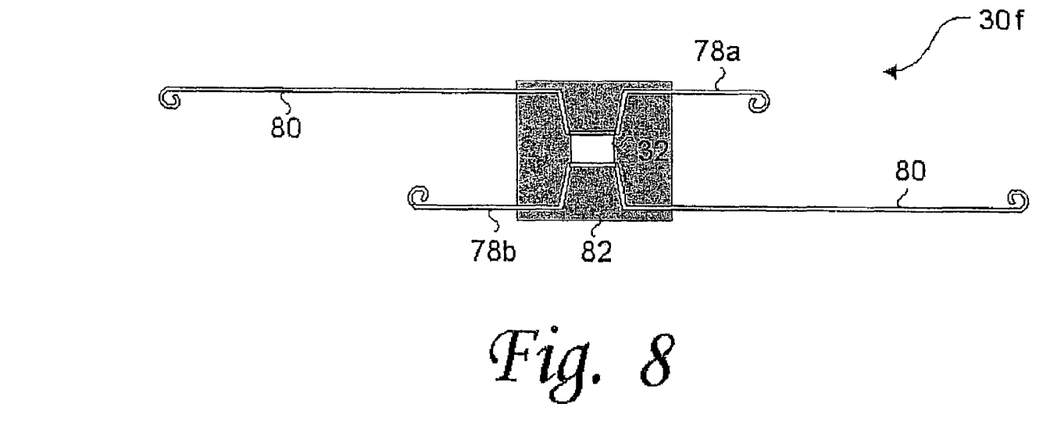
FIG. 8 is a generally plan view of another exemplary embodiment of an electronics assembly with a multi-frequency antenna in accordance with the present invention.

Yet another alternative embodiment of the present subject matter is illustrated in FIG. 8, which depicts an exemplary electronics assembly embodiment 30*f* with increased spacing among the various antenna leads. Each of first and second short antenna leads 78*a* and 78*b* as well as first and second long antenna leads 80*a* and 80*b* are first directed away from RF device 32 in opposite directions. The leads are then redirected in a parallel position similar to the configuration of FIGS. 6A and 6B. The increased spacing, which is preferably at least about 3–5 mm, helps ensure that the distinct antenna leads do not come into contact with one anther and also improves the operation of the antennas. This optional design feature may be incorporated with any of the other embodiments disclosed herein to provide increased spacing and improved antenna operation.

An additional feature that may be employed with electronics assembly embodiment 30*f* or other embodiments of the present subject matter is a support substrate 82. RF device 32 and selected portions of antenna leads 78*a*, 78*b*, 80*a* and 80*b* may be adhered to support substrate 82 in accordance with any of the known methods. The utilization of a support substrate 32 may provide additional mechanical support to the electrical connections between RF device 32 and the antenna leads. A particular example of a material suitable for forming support substrate 82 is a printed circuit board (PCB) material such as fiberglass or other such material. Another example of a suitable material for forming support substrate 82 is a high modulus rubber compound.

Figure 9:
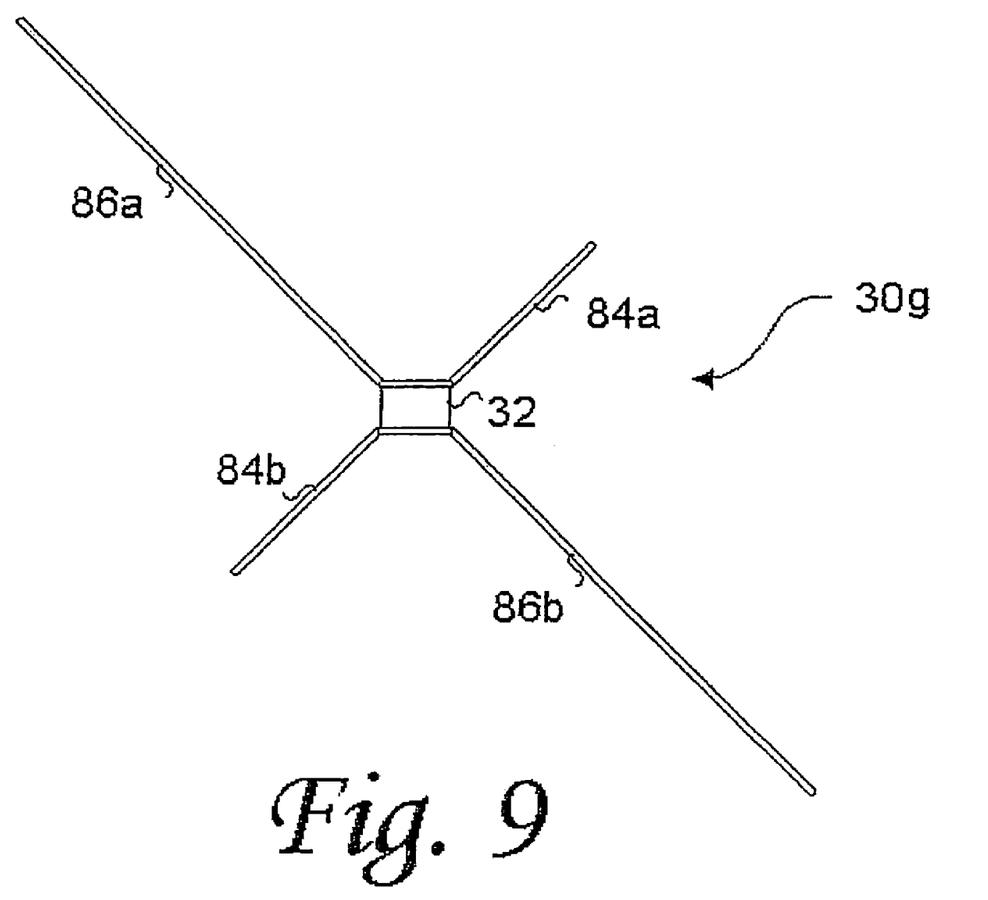
FIG. 9 is a generally plan view of another exemplary embodiment of an electronics assembly with a multi-frequency antenna in accordance with the present invention.

A still further alternative embodiment of the present subject matter is illustrated in FIG. 9, which depicts an exemplary electronics assembly embodiment 30*g*. This configuration includes an RF device 32 to which two short antenna leads 84*a* and 84*b* are connected to form a first dipole antenna operating at a first resonant frequency and to which two long antenna leads 86*a* and 86*b* are connected to form a second dipole antenna operating at a second resonant frequency. Embodiment 30*g* may be formed with four separate antenna wires. Selected of the antenna leads 84*a*, 84*b*, 86*a* and 86*b* may be formed with curved portions to facilitate RF coupling or integration within a tire structure. Also, despite the fact that the antenna leads are depicted in FIG. 9 at approximately right angles to one another, any specific angle between leads may be formed in accordance with such exemplary embodiment 30*g*. For instance, respective angles between adjacent antenna leads may be determined to effect a preferred range of transmission.

The exemplary electronics assemblies 30*a*–30*g*, respectively and corresponding antenna structures presented herein are designed to operate at multiple different frequencies, and in the specific examples presented herein, are designed to operate at a first resonant frequency and at a second resonant frequency. It should be appreciated that the subject electronics assembly and multi-frequency antenna designs are such that a selected one of such resonant frequencies may actually correspond to a given bandwidth around a give resonant frequency. This design would enable multiple distinct reader/interrogators operating at nearby frequency levels to receive RF signals provided by a single antenna design. Such is the case for reader/interrogators operating at 868 MHz and also at 915 MHz, since these two specific frequencies are separated by a relatively small bandwidth. Thus, any reference herein to antenna operation at first and second respective resonant frequencies may actually correspond to antenna operation at first and second respective frequency bands.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire assembly with integrated electronic components, said tire assembly comprising: a tire structure; a radio frequency (RF) device configured to communicate RF signals, said RF signals including at least one piece of information concerning said tire structure; and at least first and second antenna wires connected to said RF device for facilitating the communication of said RF signals at multiple different frequencies, wherein said at least first and second antenna wires extend from said RF device to form respective first and second short antenna leads and respective first and second long antenna leads, wherein said first and second short antenna leads function together to form a first dipole antenna configured for operation at a first resonant frequency and wherein said first and second long antenna leads function together to form a second dipole antenna configured for operation at a second resonant frequency.

2. A tire assembly as in claim 1, wherein said first and second dipole antennas each function as half-wave dipole antennas.

3. A tire assembly as in claim 1, wherein selected free ends of said first and second antenna wires are formed in respective curved configurations.

4. A tire assembly as in claim 1, wherein said RF device transmits RF signals of at least one frequency level selected in a frequency range from about 300 MHz to about 3000 MHz.

5. A tire assembly as in claim 1, wherein said first and second short antenna leads are each designed with a free air length of about 30 mm and wherein said first and second long antenna leads are each designed with a free-air length of about 85 mm.

6. A tire assembly as in claim 1, wherein said RF device and said at least first and second antenna wires are embedded in a dielectric material having a dielectric constant of at least about 3, and wherein said first and second short antenna leads are characterized by a length of about 16 mm and wherein said first and second long antenna leads are characterized by a length of about 47 mm.

7. A tire assembly as in claim 1, wherein selected portions of said first and second short antenna leads and said first and second long antenna leads are formed in respective curved configurations.

8. An electronics assembly for integration with a tire structure, said electronics assembly comprising: a radio frequency (RF) device configured to wirelessly communicate RF signals to a remote location, said RF signals including a predefined identification variable; and at least first and second antenna wires connected to said RF device for facilitating the transmission of said RF signals at a first resonant frequency and at a second resonant frequency further comprising third and fourth antenna wires, wherein said first and second antenna wires are both characterized by a first length and wherein said third and fourth antenna wires are both characterized by a second length, said first length and said second length being of generally different values.

9. An electronics assembly as in claim 8, wherein said first and second antenna wires function together as a first dipole antenna for operation at said first resonant frequency and wherein said third and fourth antenna wires function together as a second dipole antenna for operation at said second resonant frequency.

10. An electronics assembly as in claim 8, wherein said first and second antenna wires are each designed with a free air length of about 30 mm and wherein said third and fourth antenna wires are each designed with a free-air length of about 85 mm.

\* \* \* \* \*